United States Patent
Pummell et al.

(10) Patent No.: US 9,028,201 B2
(45) Date of Patent: May 12, 2015

(54) OFF AXIS PUMP WITH INTEGRATED CHAIN AND SPROCKET ASSEMBLY

(75) Inventors: Bruce Kevin Pummell, Milan, MI (US); Richard F. Olenzek, Farmington Hills, MI (US); David M. Woodard, Grosse Pointe Park, MI (US); Moo Ho Chung, Shelby Township, MI (US); Keith Hayen, Oxford, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 736 days.

(21) Appl. No.: 13/313,890

(22) Filed: Dec. 7, 2011

(65) Prior Publication Data
US 2013/0149110 A1    Jun. 13, 2013

(51) Int. Cl.
*F04D 13/02*   (2006.01)
*F16H 61/28*   (2006.01)
*F16H 57/04*   (2010.01)
*F16H 41/24*   (2006.01)

(52) U.S. Cl.
CPC ............... *F16H 61/28* (2013.01); *F04D 13/02* (2013.01); *F16H 57/04* (2013.01); *F16H 41/24* (2013.01); *F16H 57/0441* (2013.01)

(58) Field of Classification Search
CPC ....... F04D 13/00; F04D 13/02; F04D 13/021; F04D 13/022
USPC ........ 415/122.1, 124.1, 124.2, 121.3; 416/54, 416/170 R
See application file for complete search history.

(56) References Cited

FOREIGN PATENT DOCUMENTS

JP        2006275192 A   * 10/2006

OTHER PUBLICATIONS

Machine Translation of JP-2006275192-A.*

* cited by examiner

*Primary Examiner* — Nathaniel Wiehe
*Assistant Examiner* — Jeffrey A Brownson

(57) ABSTRACT

An off axis hydraulic pump for an automatic motor vehicle transmission includes an integrated chain and sprocket assembly. A first, chain drive sprocket is mounted on a shaft driven by an input to a torque converter and a second, driven chain sprocket is attached to a stub shaft which drives the pump. A multi-link chain encircles the sprockets and transfers drive torque from the torque converter input to the stub shaft. The first, chain drive sprocket is retained on the input shaft by a retainer cap which includes seals between both the shaft and a torque converter housing. The second, driven chain sprocket is retained on the stub shaft by a snap ring or similar component.

18 Claims, 3 Drawing Sheets

OFF AXIS PUMP WITH INTEGRATED CHAIN AND SPROCKET ASSEMBLY

FIELD

The present disclosure relates to hydraulic pumps for automatic motor vehicle transmissions and more particularly to an off axis hydraulic pump having an integrated chain and sprocket assembly.

BACKGROUND

The statements in this section merely provide background information related to the present disclosure and may or may not constitute prior art.

Many modern automatic motor vehicle transmissions utilize controlled hydraulic fluid (transmission oil) to actuate clutches and brakes to achieve desired combinations of engagements and provide a useful sequence of gear ratios. The control of such hydraulic fluid is achieved by a valve body which comprises a plurality of spool valves which direct hydraulic fluid flow through a complex of passageways to clutch and brake actuators. The valve body is supplied with pressurized hydraulic fluid from, typically, a gear, vane or gerotor pump which is driven by the engine output shaft or the transmission input shaft.

Because this is such a common transmission configuration and because of the manufacturing volume of such automatic transmissions, extensive research and development has been undertaken to reduce the cost and optimize the performance of such pumps. For example, simplifying such pumps to reduce their weight and cost, reducing their size to improve packaging, improving low speed performance, improving low temperature performance and reducing high speed energy losses have all been areas of development and improvement.

The present invention is directed to improvements which facilitate the rapid and proper assembly of such pumps as well as provide additional realized benefits to the torque converter housing (TCH) manufacturability and management of the transmission operating fluid.

SUMMARY

The present invention provides an off axis hydraulic pump for an automatic motor vehicle transmission having an integrated chain and sprocket assembly, all mounted on a pump structure assembly. A first, chain drive sprocket is mounted within a pump structure assembly and driven by a torque converter input and a second, driven chain sprocket is attached to a stub shaft which drives the pump. A multi-link chain encircles the sprockets and transfers drive torque from the torque converter input to the stub shaft. The first, chain drive sprocket is retained on the input member by a retainer cap which includes seals between both the torque converter shaft and a torque converter housing. The second, driven chain sprocket is retained on the stub shaft by a snap ring or similar component.

Thus it is an aspect of the present invention to provide a hydraulic pump for an automatic transmission which is offset from the axis of the transmission input and torque converter shafts.

It is a further aspect of the present invention to provide a hydraulic pump for an automatic transmission having a chain drive sprocket disposed within the pump structure assembly and interlocked to and driven by the torque converter input.

It is a still further aspect of the present invention to provide a hydraulic pump for an automatic transmission driven by a chain and sprocket coupled to and driven by the torque converter input.

It is a still further aspect of the present invention to provide a hydraulic pump for an automatic transmission which is more easily assembled than prior art configurations.

It is a still further aspect of the present invention to provide a hydraulic pump for an automatic transmission having a lighter torque converter housing and a larger capacity hydraulic transmission fluid sump.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
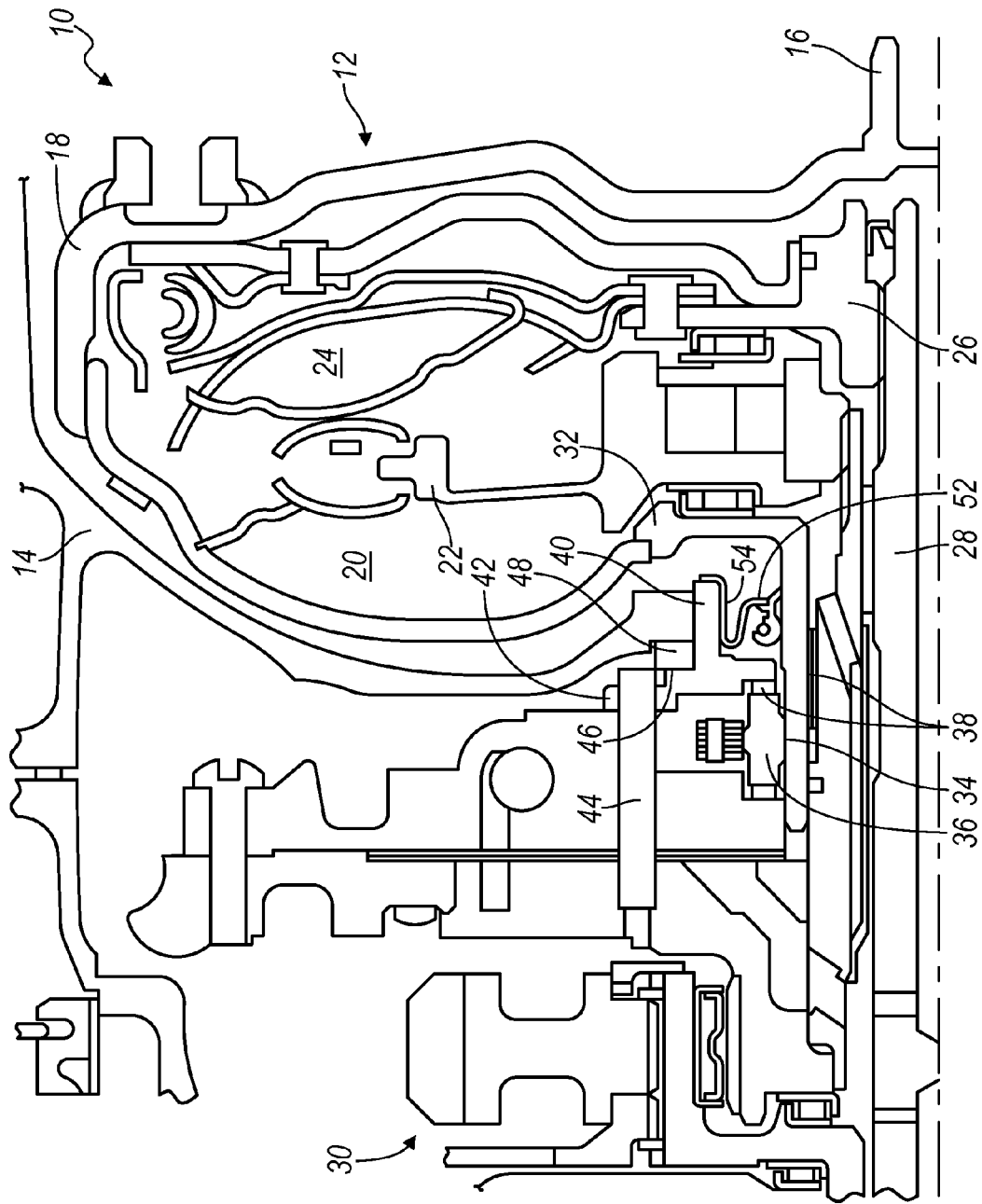
FIG. 1 is a half sectional view of a torque converter assembly and a forward (input) portion of an automatic transmission incorporating the present invention.

With reference to FIG. 1, a portion of an automatic transmission designed and intended for a motor vehicle is illustrated and generally designated by the reference number 10. The automatic transmission 10 includes a torque converter assembly 12 and a bulkhead or torque converter housing 14. The torque converter assembly 12 includes a torque converter input shaft 16 which is driven by a prime mover such as a gasoline, flex fuel, Diesel or hybrid power plant (not illustrated) and is coupled to and drives a shell or outer housing 18 of the torque converter assembly 12. The torque converter assembly 12 is conventional and includes a pump 20 which is coupled to the torque converter outer housing 18 and driven by the input shaft 16, a fixed stator assembly 22 and a turbine 24. The turbine 24 is coupled through a hub 26 to and drives a transmission input shaft 28. The transmission input shaft 28, in turn, provides drive torque to a plurality of planetary gear assemblies 30, one of which is illustrated in FIG. 1. The torque converter outer housing 18 provides drive torque to a quill or tubular member 32 and, in turn, through interengaging flats 34 to a chain drive sprocket 36 which rotates therewith. The interengaging flats 34 include a plurality of external flats on the quill or tubular member 32 and complementary internal flats in the chain drive sprocket 36. Alternatively, the quill or tubular member 32 and the chain drive sprocket 36 may include complementary splines or similar structures. Suitable anti-friction bearing assemblies 38, such as thrust and roller bearings, rotatably support and position the quill or tubular member 32 and the chain drive sprocket 36.

Figure 2:
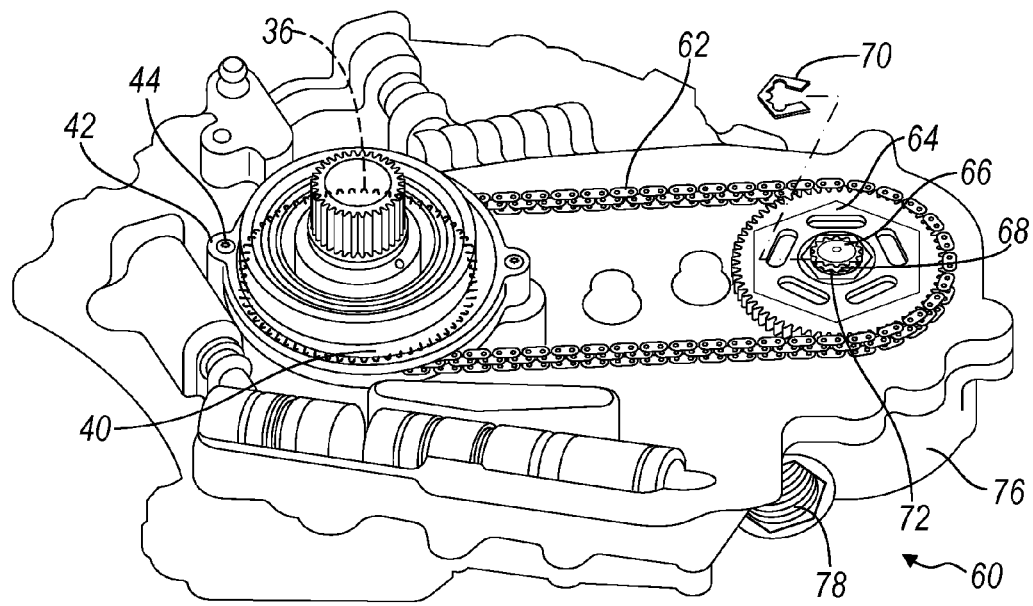
FIG. 2 is a perspective view of a pump structure assembly with an integrated chain and sprocket assembly according to the present invention.

Referring now to FIGS. 1 and 2, the chain drive sprocket 36 and the bearing assemblies 38 are retained in position on the quill or tubular member 32 by and between a circular cap or retainer 40 and a pump structure assembly 60. The circular cap or retainer 40 preferably includes two, but may include three or more projections, ears or lugs 42 on its periphery which include through passageways (not illustrated) which each receive a press fit fastener 44 such as a dowel, pin or bolt. The press fit fasteners 44 act as positioning or registering devices which seat within the pump structure assembly 60 and retain the circular cap or retainer 40 on the pump structure assembly 60 before it is assembled to the torque converter housing 14. The outer periphery of the cap or retainer 40 includes a machined surface 46 which receives and retains a square cut seal 48 which provides a fluid tight seal against a complementarily formed circular edge of the torque converter housing 14 when the pump structure assembly 60 is secured to the torque converter housing 14. A formed shaft seal 52 seats within a circular groove 54 in the cap or retainer 40 and provides a fluid tight seal between the cap or retainer 40 and the quill or tubular member 32. The outer periphery of the machined surface 46 of the cap or retainer 40 also establishes the center pilot for the pump structure assembly 60 to torque converter housing 14 which creates a rotational bearing center for the automatic transmission 10.

The chain drive sprocket 36 is a component of the off axis transmission fluid (hydraulic oil) pump structure body or assembly 60. As utilized herein, the term "off axis" means a pump input shaft 66 has an axis of rotation which is parallel to and offset from the axis of the input shaft of the transmission 10 which is the input shaft 16 of the torque converter assembly 12. The pump structure assembly 60 provides a flow of pressurized hydraulic fluid to a valve body, various valves and clutch and brake operators (all not illustrated) residing within the automatic transmission 10 to effect operation. The pump structure assembly 60 includes a multi-link chain 62 which encircles the chain drive sprocket 36 as well as a driven chain sprocket 64 which is driven by the quill or tubular member 32 and the chain drive sprocket 34 through the multi-link chain 62. The driven chain sprocket 64 is rotationally coupled to and drives the pump input shaft 66 through interengaging male and female splines 68. A snap ring, C-washer or similar component 70 which is received within a complementary feature such as a circumferential channel or groove 72 in the pump shaft 66 retains the driven chain sprocket 64 on the pump input shaft 66. The pump input shaft 66 is coupled to and drives an impeller, rotor or gear (not illustrated) disposed within a suitably shaped housing 76 in the pump structure assembly 60 which defines at least two ports 78, one of which is illustrated in FIG. 2, which function as inlet and outlet ports for the hydraulic fluid.

Figure 3:
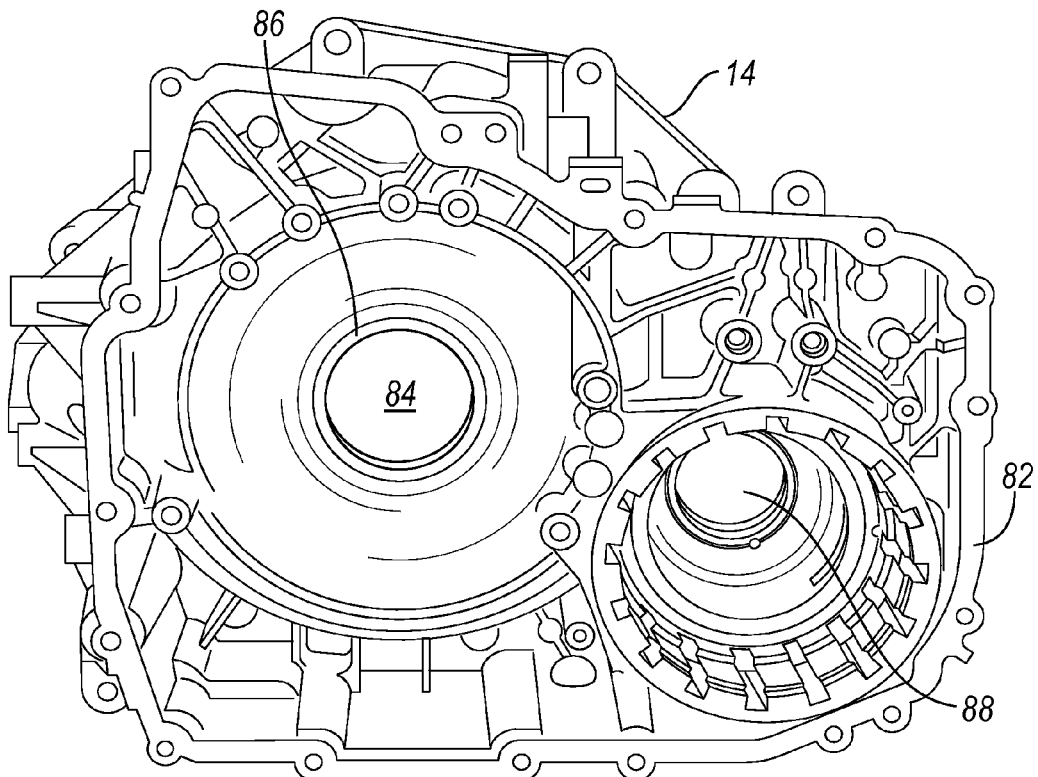
FIG. 3 is an end elevational view of a torque converter housing from the transmission side adapted to receive the present invention.

FIG. 3 illustrates one (the transmission side) face of the torque converter housing 14 which is shown in section in FIG. 1. The torque converter housing 14 includes a peripheral flange 82 which receives a gasket (not illustrated) and a first axis region or opening 84 which receives a portion of the pump structure assembly 60 and includes a circular machined surface 86 which seals to the square cut seal 48 of the circular cap or retainer 40. The torque converter housing 14 also includes a second axis opening 88 for the output torque.

Figure 4:
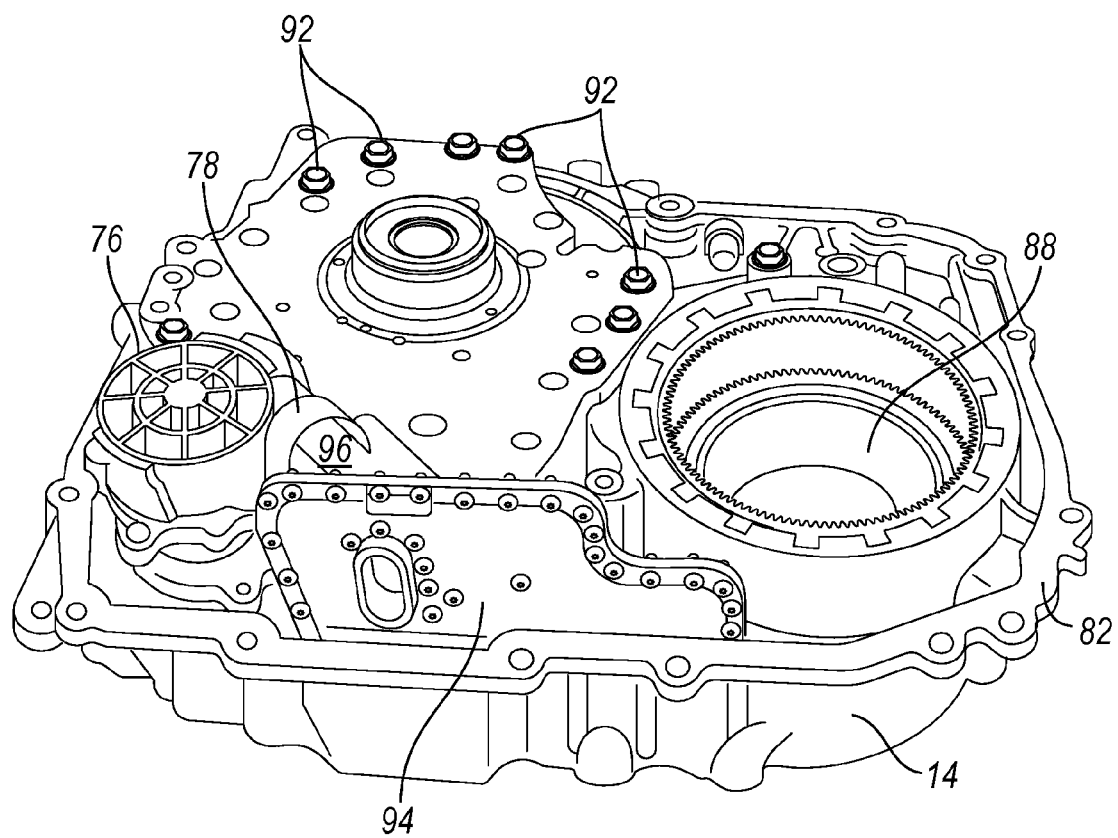
FIG. 4 is a perspective view of the torque converter housing from the transmission side with the pump structure assembly in place.

FIG. 4 illustrates the torque converter housing 14 with the pump structure assembly 60 assembled thereto. Note a plurality of threaded fasteners 92 such as machine bolts which secure the pump structure assembly 60 to the torque converter housing 14. Also clearly visible in FIG. 4 is the pump housing 76, one of the ports 78 which is the inlet port, a transmission fluid filter 94 and an inlet or suction line 96 which communicates with the inlet port 78.

It should be appreciated that the off axis hydraulic pump having an integrated chain and sprocket assembly according to the present invention provides numerous benefits.

First of all, it eliminates blind assembly. In previous pump configurations, it was necessary to assemble the pump to the torque converter housing over the sprocket and the chain. This required axial alignment and engagement of both the splined pump input shaft 66 with the driven chain sprocket 64 and also insertion of the stator shaft component of the pump structure through a seal. This necessary assembly step was both difficult, time consuming and risked damage to the seal.

Second of all, the complexity of the cast housing 14 of the torque converter 12 has been reduced, resulting in improved casting quality and elimination of the need for additional machining operations by removing structure in the torque converter housing 14 which, in previous designs, supported the driven chain sprocket 64 and the torque converter shaft seal 52.

Third of all, because the above noted components or features of the torque converter housing 14 have been eliminated, the overall weight of the transmission 10 has been reduced. In an early prototype, a mass reduction of 0.44 Kg (approximately one pound) was achieved.

Finally, because of the removal of features and material from the torque converter housing 14 as described above, an increase in the volume of the hydraulic fluid sump in the transmission 10 has been achieved. Again, in an early prototype, an increase in sump volume of 0.14 liters (0.15 quarts) was achieved. This enabled an oil level drop of approximately 7 mm. (0.275 in.) resulting in reduced spin losses.

The description of the invention is merely exemplary in nature and variations that do not depart from the gist of the invention are intended to be within the scope of the invention. Such variations are not to be regarded as a departure from the spirit and scope of the invention.

What is claimed is:

1. An off axis hydraulic pump for an automatic transmission comprising, in combination,
    a torque converter housing having a first opening for at least one rotating torque transfer member and a second opening,
    a torque transfer member disposed in said first opening,
    a pump structure assembly including a chain drive sprocket mounted on said torque transfer member, a retaining cap disposed over said chain drive sprocket and including a first stationary seal between said cap and said torque converter housing and a second shaft seal between said cap and said rotating torque transfer member, a hydraulic pump having a drive shaft, a driven chain sprocket mounted on said drive shaft, means for retaining said driven chain sprocket on said drive shaft, and a chain engaging said chain drive sprocket and said driven chain sprocket.

2. The off axis hydraulic pump of claim 1 wherein axes of said first and second openings are parallel to and offset from one another.

3. The off axis hydraulic pump of claim 1 wherein said means for retaining said driven sprocket is one of a snap ring and a C-washer.

4. The off axis hydraulic pump of claim 1 wherein said chain drive sprocket is rotationally coupled to said torque transfer member by interengaging flats.

5. The off axis hydraulic pump of claim 1 wherein said driven chain sprocket is rotationally coupled to said drive shaft by interengaging splines.

6. The off axis hydraulic pump of claim 1 wherein said torque transfer member is a quill coupled to and driven by an input to a torque converter.

7. The off axis hydraulic pump of claim 1 further including means for locating said retaining cap on said pump structure assembly.

8. The off axis hydraulic pump of claim 1 further including an additional torque transfer member extending through said first opening of said torque converter housing and adapted to carry an output from a torque converter.

9. An off axis hydraulic pump for installation in an automatic transmission comprising, in combination,
 a torque converter housing having a first opening for receiving a rotating torque transfer member and a second opening offset from said first opening,
 a torque transfer member disposed in said first opening,
 a pump structure assembly including a chain drive sprocket engaged to said torque transfer member, a retaining cap disposed over said chain drive sprocket and including means for disposing said retaining cap on said pump structure assembly, a first stationary seal between said cap and said torque converter housing and a second shaft seal between said cap and said rotating torque transfer member, a hydraulic pump having a drive shaft, a driven chain sprocket mounted on said drive shaft, means for retaining said driven chain sprocket on said drive shaft, and a chain engaging said chain drive sprocket and said driven chain sprocket.

10. The off axis hydraulic pump of claim 9 wherein an axis of said drive shaft of said pump is parallel to an input torque axis of said pump structure.

11. The off axis hydraulic pump of claim 9 wherein said means for retaining said driven sprocket is one of a snap ring and a C-washer.

12. The off axis hydraulic pump of claim 9 wherein said chain drive sprocket is rotationally coupled to said torque transfer member by interengaging flats.

13. The off axis hydraulic pump of claim 9 wherein said driven chain sprocket is rotationally coupled to said drive shaft by interengaging splines.

14. The off axis hydraulic pump of claim 9 wherein said torque transfer member is a quill coupled to and driven by an input to a torque converter.

15. The off axis hydraulic pump of claim 9 further including an additional torque transfer member extending through said first opening of said torque converter housing and adapted to carry an output torque from a torque converter.

16. An off axis hydraulic pump for installation in an automatic transmission comprising, in combination,
 a torque converter housing having a first opening for receiving a rotating torque transfer member and defining a first axis and a second opening offset from said first opening and defining a second axis parallel to said first axis,
 a torque transfer member disposed in said first opening,
 a pump structure assembly including a chain drive sprocket mounted on and coupled to said torque transfer member by interengaging flats, a retaining cap disposed over said chain drive sprocket and including at least one dowel extending between said retaining cap and said pump assembly, a first fixed seal between said retaining cap and said torque converter housing and a second shaft seal between said retaining cap and said rotating torque transfer member, a hydraulic pump having a drive shaft, a driven chain sprocket mounted on and coupled to said drive shaft by interengaging splines, means for retaining said driven chain sprocket on said drive shaft, and a chain engaging said chain drive sprocket and said driven chain sprocket.

17. The off axis hydraulic pump of claim 16 further including an additional torque transfer member extending through said first opening of said torque converter housing and adapted to carry an output torque from a torque converter.

18. The off axis hydraulic pump of claim 16 wherein said torque transfer member is a quill coupled to and driven by an input to a torque converter.

\* \* \* \* \*